P. S. RUSSELL.
Cultivator.

No. 211,792. Patented Jan. 28, 1879.

Witnesses
Geo. H. Strong.
Frank A. Brooks

Inventor
P. S. Russell
By Dewey & Co.
Atty

UNITED STATES PATENT OFFICE.

PRIOR S. RUSSELL, OF RIVERSIDE, CALIFORNIA.

IMPROVEMENT IN CULTIVATORS.

Specification forming part of Letters Patent No. 211,792, dated January 28, 1879; application filed November 9, 1878.

*To all whom it may concern:*

Be it known that I, PRIOR S. RUSSELL, of Riverside, county of San Bernardino and State of California, have invented a Cultivator; and I do hereby declare the following to be a full, clear, and exact description thereof, reference being had to the accompanying drawings.

My invention relates to that class of cultivators which are mounted on wheels, and on which the frame carrying the teeth may be lifted so as to take the teeth from the ground; and it consists in combining certain details and instrumentalities in a cultivator, as hereinafter described, and particularly claimed.

Figure 1:
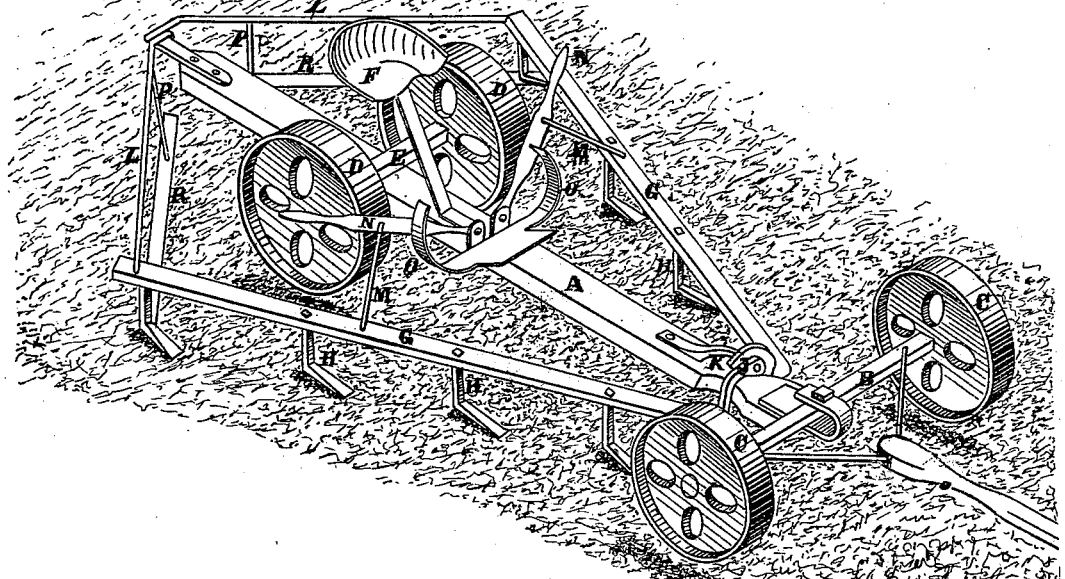
Figure 2:
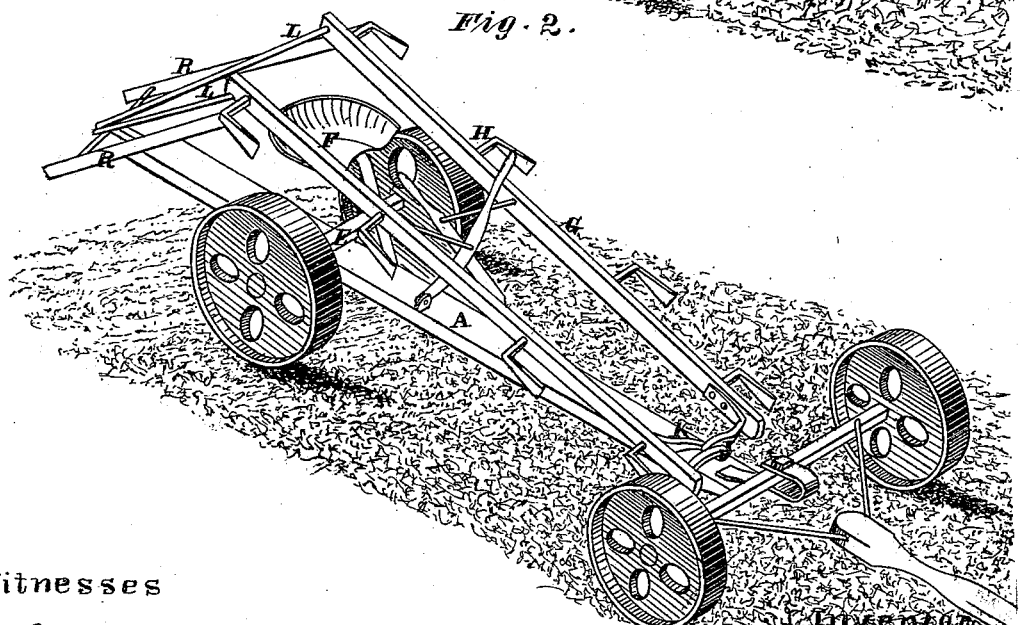

Figures 1 and 2 are views of my invention, showing it in different positions.

A represents the central beam, which is supported at the front end by the front axle, B, pivoted to it, as shown, and resting on the wheels C. The rear end of the beam is supported by the wheels D on an axle, E, placed a short distance from the rear end of said beam, and under the driver's seat F.

The rear axle is made short, as shown, so that the wheels on which it rests may be inside of the timbers or wings G, which carry the teeth H.

A tongue, I, is attached to the front axles, to which the horses are harnessed, so that the driver on his seat has complete control over the cultivator, the front axle being swiveled to the beam, and the cultivator can be guided with great ease.

The cultivator proper, formed of the two beams or wings G, is A-shaped. The front ends have curved bars J attached to them, which bars are pivoted on the bolt K on the beam, as shown, so that the wings may be raised and lowered at will. At the rear ends of the wings are the brace-bars L, pivoted to the rear end of the beam A. In the center of each wing is an upright rod, M, fastened to the hand-levers N, which levers are pivoted to the central beam, as shown, and ratchet-bars O on the central beam lock the levers in any desired position, so that the side wings may be kept down or up, as desired. This raising and lowering of the side wings is possible, for the reason that they are pivoted or hinged to the center beam at both ends, as hereinafter described. As these wings can be raised entirely clear of the ground, the cultivator can travel to and from the field with great facility.

Either wing may be moved independently when at work to clear it of weeds or raise it over rocks or other obstructions.

At the rear end of the brace-bars L on each side extends downward a rod, P, as shown. At the lower end of this rod is secured a knife or blade, R, the other end of which is fastened to the rear tooth of the wing. These blades or knives are secured in such a manner that when the side wings are down and at work the knives move horizontally through the earth and cut off any weeds which may have escaped the teeth, leaving the ground perfectly clean.

The wheels are made broad on the face, so as not to sink into the ground or allow the cultivator-teeth to go too deep. The teeth are made with their points inclined, so as to turn or break the soil up as they are dragged through it; but the wheels prevent their digging so deep as to make a heavy draft for the team.

The arrangement of the wings with teeth and cutters, so as to be raised clear of the ground, enables the operator to travel to and from the field with facility, and either wing can be raised while at work and cleared of weeds or rubbish.

Any weeds which escape the teeth are cut by the cutters, so that the field is thoroughly cultivated.

This cultivator is intended principally for orchards and vineyard work. It pulverizes the ground to the depth of four or five inches, at the will of the operator; and by means of the tongue and seat the driver has complete control over his team and machine, thereby being able to work close to the rows of trees or vines without injuring them.

Having thus described my invention, what I claim as new, and desire to secure by Letters Patent, is—

The improvement in cultivators or soil-dressers consisting of the non-adjustable central beam A, mounted upon the stationary and turning pairs of wheels, C D, and provided with the hinged adjustable diverging wings G, with their operating-levers, as shown, said wings being provided with the chisels or teeth H and the diagonally-arranged cutters R, substantially as and for the purpose herein described.

In witness whereof I have hereunto set my hand and seal.

PRIOR S. RUSSELL. [L. S.]

Witnesses:
 ISAAC N. HOBILL,
 JACKSON R. NOLAND.